United States Patent [19]
Hood, III et al.

[11] Patent Number: 6,058,009
[45] Date of Patent: May 2, 2000

[54] COMPUTER WITH IMPROVED INTERNAL COOLING SYSTEM

[75] Inventors: Charles D. Hood, III, Cedar Park; James Utz, Pflugerville, both of Tex.

[73] Assignee: Dell USA, L.P., Round Rock, Tex.

[21] Appl. No.: 09/115,039

[22] Filed: Jul. 14, 1998

[51] Int. Cl.[7] .................................................. H05K 7/20
[52] U.S. Cl. ...................... 361/687; 361/695; 361/700
[58] Field of Search .................... 361/687, 688, 361/694–702, 725, 727

[56] References Cited

U.S. PATENT DOCUMENTS

| | | |
|---|---|---|
| 4,356,531 | 10/1982 | Marino et al. ............................ 361/687 |
| 4,383,286 | 5/1983 | Hicks ....................................... 361/687 |
| 4,739,445 | 4/1988 | Trasen ..................................... 361/687 |
| 5,552,960 | 9/1996 | Nelson et al. . |
| 5,596,483 | 1/1997 | Wyler ..................................... 361/687 |
| 5,634,351 | 6/1997 | Larson et al. . |
| 5,793,608 | 8/1998 | Winick et al. ........................... 361/695 |
| 5,831,525 | 11/1998 | Harvey .................................... 361/687 |
| 5,852,547 | 12/1998 | Kitlas et al. ............................. 361/695 |
| 5,862,037 | 1/1999 | Behl ........................................ 361/699 |

*Primary Examiner*—Gregory Thompson
*Attorney, Agent, or Firm*—Haynes & Boone, L.L.P.

[57] ABSTRACT

A portable computer according to which a processor is disposed in a chassis. A module housing is provided for insertion into and removal from, the chassis and contains a fan for flowing air from the processor, through the module housing and externally of the housing to cool the processor.

21 Claims, 2 Drawing Sheets

COMPUTER WITH IMPROVED INTERNAL COOLING SYSTEM

TECHNICAL FIELD

This disclosure relates generally to computers, and more particularly to a portable computer having an improved air cooling system for its internal components.

BACKGROUND

As the performance capabilities of portable computers, such as notebooks, laptops, and the like, increase, the heat generated by components within the computer also increases during operation. To insure that the components remain within their normal operating temperature ranges, this heat generated by the components must be dissipated from the computer since, otherwise, the components could fail prematurely. This is especially true in connection with the computer's processor which generates heat in proportion to increases in its speed.

One of the most effective techniques currently being utilized to dissipate heat from a computer is to provide an internal fan to directly apply a relatively high velocity air across the surface of the internal components, or heat sinks associated with the components. This raises the convective heat transfer coefficient for the surface of the internal components, thereby increasing the convection cooling. Although this cooling scheme is effective, the maximum heat dissipation is limited by the size of the fan and the size of the heat sink/heat exchanger that will fit into the computer, especially a portable computer.

Therefore, what is needed is a portable computer according to which improved cooling is provided for the computer.

SUMMARY

Accordingly, an embodiment of the present invention is directed to a portable computer having a processor disposed in a chassis. A module housing is provided for insertion into and removal from, the chassis and contains a fan for flowing air from the processor, through the module housing and externally of the housing to cool the processor. The fan in the module housing establishes a heat transfer path and an additional heat transfer path is provided by a heat sink in a heat transfer relation to the processor. A power source can also be provided in the module housing to supply additional power to the computer.

Advantages are thus achieved with the computer of the present disclosure since additional power and cooling are available which can be utilized to enable an improved performance mode.

DETAILED DESCRIPTION OF THE PREFERRED EMBODIMENT

Figure 1:
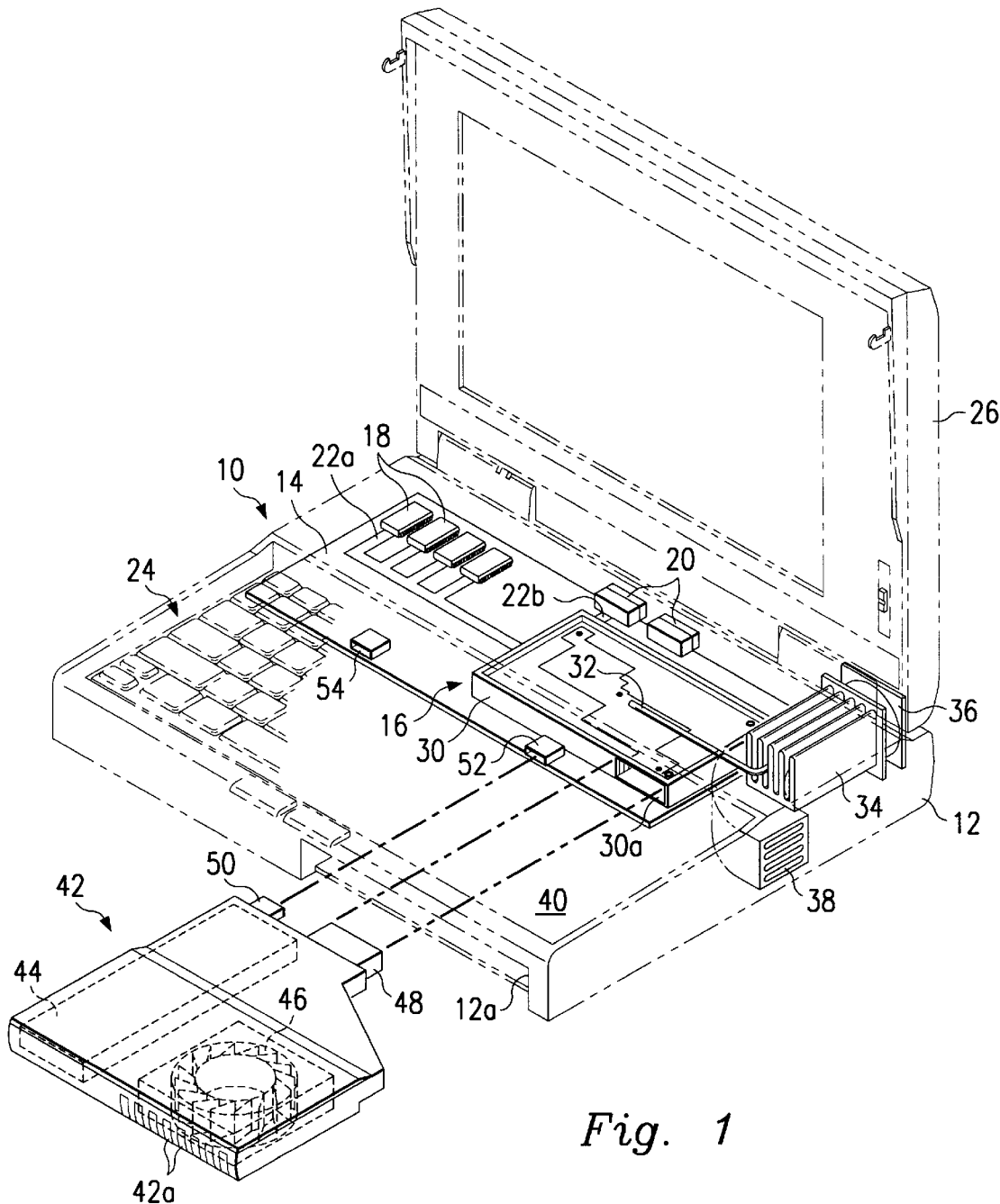
FIG. 1 is an isometric view of the portable computer according to an embodiment of the present invention.

Referring to FIG. 1 of the drawings, the reference numeral 10 refers, in general, to a portable computer according to an embodiment of the present invention, which can be a laptop computer, a notebook computer, or the like. The computer 10 includes a chassis 12 (shown in phantom lines) in which a motherboard 14 is mounted. A processor 16, four memory modules 18, and two input/output (I/O) devices 20 are mounted on the motherboard 14. Buses 22a and 22b are also provided on the motherboard 14 that connect the processor 16 to the memory modules 18 and to the input/output devices 20, respectively.

Figure 2:
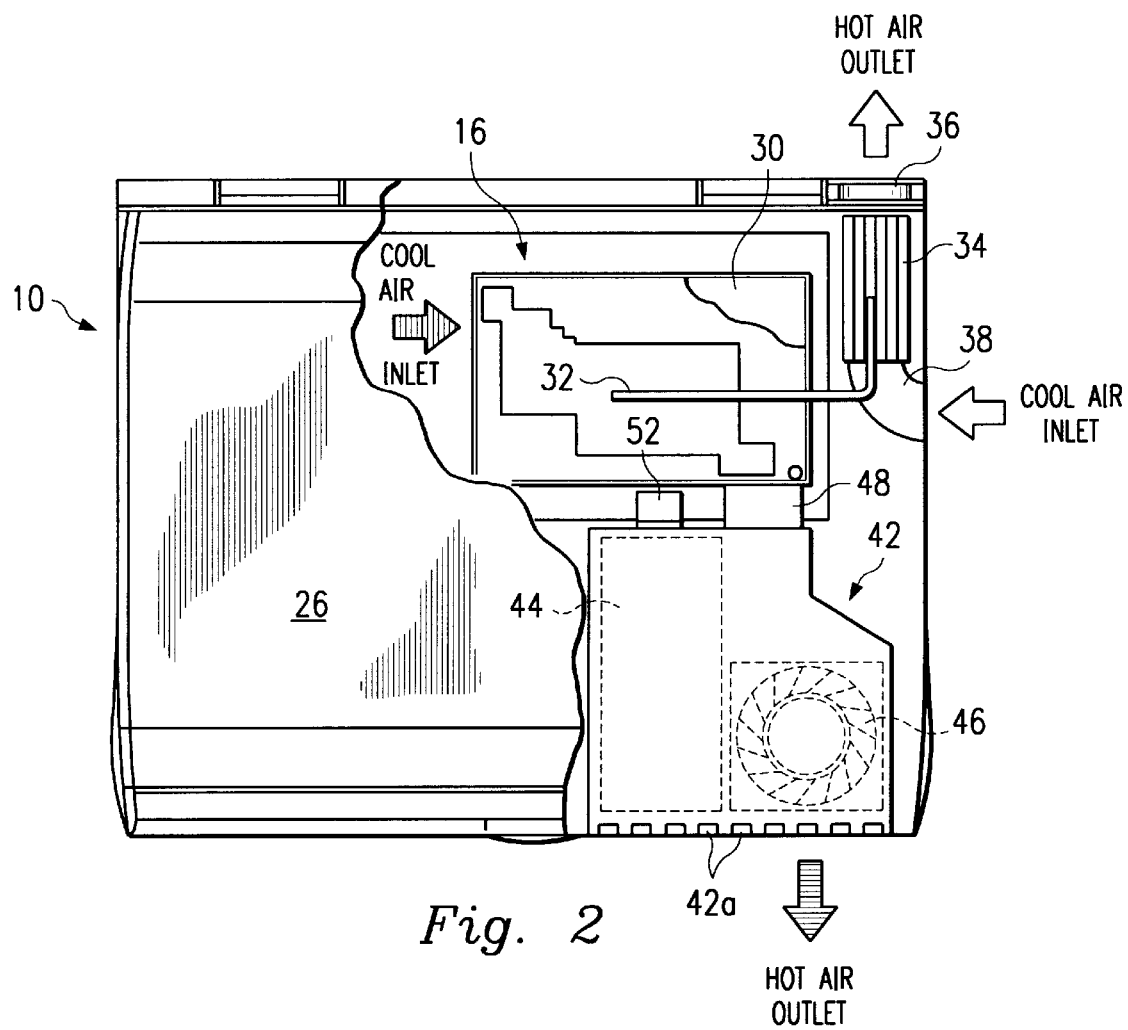
FIG. 2 is a top plan view of the computer of FIG. 1 depicting a portion of the internal components of the computers.

A keyboard 24 forms at least a portion of the upper surface of the housing, and a cover 26 is hinged to the rear end portion of the chassis 12 in any known manner, and can be moved between the open position shown and a closed position shown partially in FIG. 2 in which it covers the upper surface of the chassis, including the keyboard 24. Although not shown in the drawings, it is understood that a hard drive unit, a battery and other components, electrical traces, electrical circuits and related devices are also provided in the chassis 12. Since all of the above is conventional, it will not be described in any further detail.

Referring to FIGS. 1 and 2, the processor 16 includes a housing 30, preferably formed by a sheet metal cap and a printed circuit board. A heat pipe 32 has a portion extending in the processor housing 30 and a portion projecting from a side wall of the housing. A heat sink 34 is mounted in the chassis 12 in a corner adjacent a rear wall and a sidewall of the chassis and receives a portion of the heat pipe between two adjacent fins.

A muffin fan 36 is mounted in an opening in the rear wall of the chassis 12 just behind the heat sink 34. An air duct 38 is disposed in the chassis 12 and has an inlet extending flush with a sidewall of the chassis and registering with an opening formed in the sidewall. The air duct 38 bends for ninety degrees and extends to the heat sink 34. As a result, heat dissipated by the processor 16 is transferred, via the heat pipe 32, to the heat sink 34; while the fan 36 pulls ambient air into and through the above-mentioned opening in the sidewall of the chassis 12, into and through the air duct 38, across the heat sink 34 and out of the housing through the above-mentioned opening in the rear wall of the housing as shown by the light air flow arrows in FIG. 2. The heat and air flow establishes a primary heat transfer path from the processor 16 according to which heat generated by the processor 16 is transferred to, and dissipated by, the heat sink 34 and transferred to the air flowing past the heat sink before the air is exhausted from the chassis 12 to the atmosphere.

A "media" bay 40 is formed in the interior of the chassis 12 near the front thereof and is accessible through an open slot 12a in the front wall of the chassis 12. The bay 40 is designed to normally receive a floppy drive, a CD ROM drive, or a second battery. According to a feature of the present disclosure, a module housing 42 is provided that is designed to be inserted into the bay 40 through the slot 12a. A battery 44 and a squirrel-cage fan 46 are disposed in the module housing 42 and are attached thereto in any known matter. Although not clear from the drawings, it is understood that the fan 46 is connected to, and powered by, the battery 44 in a conventional manner.

An air duct 48 and a connector 50 are provided on the leading end of the module housing 42. When the module housing 42 is inserted into the bay 40 as shown in FIG. 2, the air duct 48 registers with a slot 30a formed in the front wall of the processor housing 30, and the connector 50 connects to a corresponding connector 52 provided on the motherboard. This latter connection transfers power from the battery 44 to the motherboard 14, and therefore to the components of the computer 10, which power is supplementary to the power provided by the standard battery (not shown) provided in the chassis 12. A temperature sensor 54 is mounted on the motherboard 14 and is adapted to sense the temperature in the chassis 12 and selectively operate the fan 46 accordingly.

A slot or opening (not shown) is provided in the processor housing 30 along the left side wall thereof as viewed in FIGS. 1 and 2, to form an inlet to permit relatively cool air to enter the latter housing in a direction indicated by the dark flow arrow in FIG. 2. Similarly, a plurality of outlet openings 42a are provided in the trailing end of the module housing 42. When the fan 46 is actuated, it draws air into the processor housing 30 through the latter inlet, and the air flows through the housing, exits the slot 30a, and flows into the air duct 48. The air then passes through the module housing 42 before exiting to atmosphere through the openings 42a as shown by the dark outlet arrow. This establishes a secondary heat transfer path from the processor 16 according to which heat generated by the processor is transferred to the air before the air is exhausted into the atmosphere.

As a result of the foregoing, the computer 10 can be operated in a normal mode with a floppy drive, a CD ROM, or the like in the media bay 40. However, if it is desired to operate in a higher performance mode that requires more input power and produces more heat, the module housing 42 is inserted into the media bay 40 and the battery 44 and the fan 46 are activated as needed. This produces more power and enables the system to operate at a higher performance level as a result of the fan 46 dissipating additional heat from the processor 16 through the secondary cooling air flow path shown by the dark flow arrows.

Therefore, additional power and cooling can be selectively provided to the computer 10 to enable it to effectively dissipate heat generated by its internal components, without requiring permanent installation of the additional battery 44 and cooling fan 46.

It is understood that variations may be made in the foregoing without departing from the scope of the invention. For example, the embodiment described above is not limited to cooling the processor of the computer, but is equally applicable to cooling any internal component of the computer. Also the cooling technique of the present embodiment is not limited to use with the particular type of portable computer described above by means of example, but is equally applicable to any type of self-contained computer or data processing and/or storage device. Also, the module housing 42 can be disposed in its own dedicated bay rather than the standard media bay 40 of the computer. It is also understood that the embodiment described above is intended to illustrate rather than limit the invention, and that the mounting assembly can take many other forms and embodiments within the scope of the invention.

What is claimed is:

1. A portable computer comprising a chassis; at least one processor disposed in the chassis and comprising a housing, and a printed circuit board connected to the housing; at least one memory device disposed in the chassis; a module housing for insertion into and removal from, the chassis; an air duct disposed on the module housing that registers with a opening formed in the processor housing; and a fan disposed in the module housing for flowing air from the processor, through the air duct and the module housing and externally of the housing to cool the processor.

2. The computer of claim 1 further comprising a plurality of openings formed in the module housing for exhausting the air from the module housing into the atmosphere.

3. The computer of claim 1 further comprising a battery disposed in the module housing for supplying power to the computer.

4. The computer of claim 3 further comprising a motherboard disposed in the chassis for receiving the processor and corresponding connectors disposed on the module housing and the motherboard, respectively, for electrically connecting the battery to the motherboard.

5. The computer of claim 1 wherein the module housing is adapted to be selectively inserted and removed from a bay formed in the chassis for receiving one of a plurality of additional components.

6. The computer of claim 1 wherein the module housing is insertable into, and withdrawable from, the chassis through a slot formed in a wall of the chassis.

7. A portable computer comprising a chassis; at least one processor disposed in the chassis; at least one memory device disposed in the chassis; a heat sink disposed in the chassis; a heat pipe extending from the processor to the heat sink to transfer heat from the processor to the heat sink; a air duct disposed in the chassis, registering with an opening formed in a chassis wall, and extending to the heat sink; a fan disposed around an opening in the chassis wall for passing air through the air duct and the heat sink to transfer the heat dissipated by the heat sink externally of the chassis; a module housing for insertion into and removal from, the chassis; and a fan disposed in the module housing for flowing air from the processor, through the module housing and externally of the housing to further cool the processor.

8. A method of cooling a portable computer having a chassis, a processor disposed in the chassis, and a bay formed in the chassis; the method comprising the steps of inserting a module housing into the bay, providing an air duct on the module housing that registers with an opening in the processor to permit air flow from the processor to the module housing, and providing a fan in the module housing for flowing air from the processor, through the module housing and externally of the housing to transfer heat from the processor and cool the processor.

9. The method of claim 8 further comprising the step of withdrawing the module housing from the chassis bay, and inserting another component into the chassis bay.

10. The method of claim 8 further comprising the step of exhausting the air from the module housing into the atmosphere.

11. The method of claim 8 further comprising the step of providing a power source in the module housing and supplying the power from the power source to the computer.

12. The method of claim 11 further comprising the step of electrically connecting the power source to the motherboard.

13. The method of claim 8 wherein the air flow establishes a first air flow path including the processor and further comprising the step of establishing a second air flow path through the processor.

14. The method of claim 13 wherein the second step of establishing comprises the step of providing a heat sink in the chassis, and flowing air from the processor through the heat sink to transfer heat from the processor to the heat sink.

15. The method of claim 14 further comprising the step of flowing air over the heat sink to transfer the heat from the heat sink to the air and exhausting the air from the chassis.

16. A portable computer comprising a chassis; a processor disposed in the chassis; a heat sink disposed in the chassis; a heat pipe for transferring heat from the processor to the heat sink; a fan mounted to a wall of the chassis and adapted to flow air in a first heat transfer path from the processor, over the heat sink, and externally of the chassis; a module housing insertable into, and removable from, the chassis; and a fan disposed in the module housing for establishing a second heat transfer path from the processor externally of the chassis.

17. The computer of claim 16 wherein the chassis includes a media bay and a slot formed in a wall of the chassis communicating with the media bay, the module housing being insertable into, and removable from, the chassis through the slot.

18. A portable computer comprising a chassis, a processor disposed in the chassis and comprising a housing, a fan mounted to a wall of the chassis for establishing a first heat transfer path from the processor externally of the chassis, a module housing insertable into, and removable from, the chassis, a air duct connecting the processor housing to the modular housing, and a fan disposed in the module housing for establishing a second heat transfer path from the processor housing, through the module housing, and externally of the chassis.

19. The computer of claim 18 wherein the chassis includes a media bay and a slot formed in a wall of the chassis communicating with the media bay, the module housing being insertable into, and removable from, the chassis through the slot.

20. A portable computer comprising a chassis, a processor disposed in the chassis, a fan mounted to a wall of the chassis for establishing a first heat transfer path from the processor externally of the chassis, a module housing insertable into, and removable from, the chassis, a fan disposed in the module housing for establishing a second heat transfer path from the processor externally of the chassis, and a power source disposed in the module housing for supplying power to the latter fan and to components of the computer.

21. The computer of claim 20 wherein the chassis includes a media bay and a slot formed in a wall of the chassis communicating with the media bay, the module housing being insertable into, and removable from, the chassis through the slot.

* * * * *